United States Patent
Archbold

(10) Patent No.: US 12,498,779 B2
(45) Date of Patent: Dec. 16, 2025

(54) METHOD AND APPARATUS FOR REDUCING POWER CONSUMPTION IN A HARDWARE TOKEN READER

(71) Applicant: Universal Electronics Inc., Scottsdale, AZ (US)

(72) Inventor: Michael Archbold, Carlsbad, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 0 days.

(21) Appl. No.: 17/556,471

(22) Filed: Dec. 20, 2021

(65) Prior Publication Data
US 2023/0195203 A1 Jun. 22, 2023

(51) Int. Cl.
G06F 1/3287 (2019.01)
G06K 7/10 (2006.01)

(52) U.S. Cl.
CPC ....... G06F 1/3287 (2013.01); G06K 7/10366 (2013.01)

(58) Field of Classification Search
CPC ............ G06F 1/3287; G06K 7/10366
See application file for complete search history.

(56) References Cited

U.S. PATENT DOCUMENTS

| | | | |
|---|---|---|---|
| 5,996,080 A * | 11/1999 | Silva | G06F 1/1626 345/169 |
| 2003/0189096 A1 * | 10/2003 | Markkanen | G06K 19/07769 235/451 |
| 2007/0135078 A1 | 6/2007 | Ljung | |
| 2008/0162361 A1 * | 7/2008 | Sklovsky | G06Q 20/327 705/64 |
| 2013/0063253 A1 | 3/2013 | Rashid et al. | |
| 2013/0205156 A1 * | 8/2013 | Niitsuma | G06F 1/3287 713/324 |
| 2015/0244426 A1 * | 8/2015 | Awad | H04W 4/80 455/41.1 |
| 2021/0044978 A1 | 2/2021 | Michaelis | |

OTHER PUBLICATIONS

ISA/US, ISR/WO issued in PCT/US22/52406, dated Mar. 7, 2023, 24 pgs.
Extended Search Report from European application No. 22912287.4, dated Mar. 13, 2025, 10 pp.

* cited by examiner

*Primary Examiner* — Kim Huynh
*Assistant Examiner* — Cole Jiawei Wentzel
(74) *Attorney, Agent, or Firm* — Greenberg Traurig, LLP

(57) ABSTRACT

A method and apparatus for reducing power consumption of a battery-powered, hardware token reader. A secure access module within the battery-powered hardware token reader is disabled by a main processor while the battery-powered hardware token reader is in a low-power mode of operation. The main processor also enables communications directly with a tag transceiver and then places itself into a sleep state. When a hardware token is placed within the range of the tag transceiver, the tag transceiver wakes the main processor, and the main processor, in turn, powers the secure access module on and initializes it so that the main processor can read information stored on the hardware token via the secure access module.

16 Claims, 6 Drawing Sheets

METHOD AND APPARATUS FOR REDUCING POWER CONSUMPTION IN A HARDWARE TOKEN READER

BACKGROUND

I. Field of Use

The present application relates to the field of home security. More specifically, the present application relates to a method and apparatus for reducing power consumption in a battery-powered hardware token reader.

II. Description of the Related Art

Security systems for homes and businesses are commonplace in the United States and many other countries. Such security systems typically comprise a central controller, or "panel" installed in a home or business and a number of security sensors, such as door/window sensors, motion sensors, glass break sensors, etc. The sensors report to the central controller when a violation occurs, i.e., a door or window is opened, motion is detected, etc. In response, when the system is armed, the central controller may then cause a loud siren inside or outside the home or business to sound, and/or notify a remote monitoring center of the violation, which may dispatch the police, firefighters and/or other first responders if necessary.

In most security systems, a keypad is also coupled to the panel and located near an entry door, such as a front door of a home. The keypad is used to arm the security system when a person is leaving the home, and to disarm the system when the person returns. One or more valid security system codes must be entered into the keypad in order to disarm the security system upon returning home. Otherwise, after a delay period of about 30 seconds, the panel will consider that an unauthorized person has entered the home and will cause a loud siren to sound and/or notify a remote monitoring center.

One of the disadvantages of using a keypad in home security systems to disarm a system is that they are somewhat intimidating. For example, upon returning to an armed home, a person must enter a correct numeric code into the keypad within a relatively short time period, such as 30 seconds. During this time, the keypad may emit a series of tones that indicate that the system has detected an intrusion and will sound the siren and/or contact the remote monitoring center unless the proper code is entered by the time the time period expires. The tones may cause the person to experience a significant amount of stress to enter the correct code.

It would be desirable, therefore, to reduce or eliminate the stress of having to enter a security code into a keypad when a person wishes to disarm a security system.

SUMMARY

The embodiments described herein relate to a method and apparatus for reducing power consumption of a battery-powered hardware token reader. In one embodiment, a method is described, comprising initializing, by a main processor of the battery-powered hardware token reader, a secure access module coupled to the main processor, the secure access module for providing a secure means of communication between a tag transceiver of the battery-powered hardware token reader and the main processor and after initializing the secure access module, immediately disabling, by the main processor, the secure access module.

In another embodiment, a battery-powered hardware token reader is described, comprising a non-transitory memory for storing processor-executable instructions, a tag transceiver, a secure access module for encrypting and decrypting information sent between the tag transceiver and a main processor, and the main processor, coupled to the non-transitory memory, the tag transceiver, the secure access module, the main processor for executing the processor-executable instructions that causes the battery-powered hardware token reader to initialize, by the main processor, the secure access module, and after initializing the secure access module, immediately disable, by the main processor, the secure access module.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The present description relates to an apparatus and method for reducing power consumption in a battery-powered hardware token reading device, such as an RFID reader, NFC reader, a bar code scanner, etc. In one embodiment, an RFID reader is described, used with a security system to at least disarm the security system.

Figure 1:
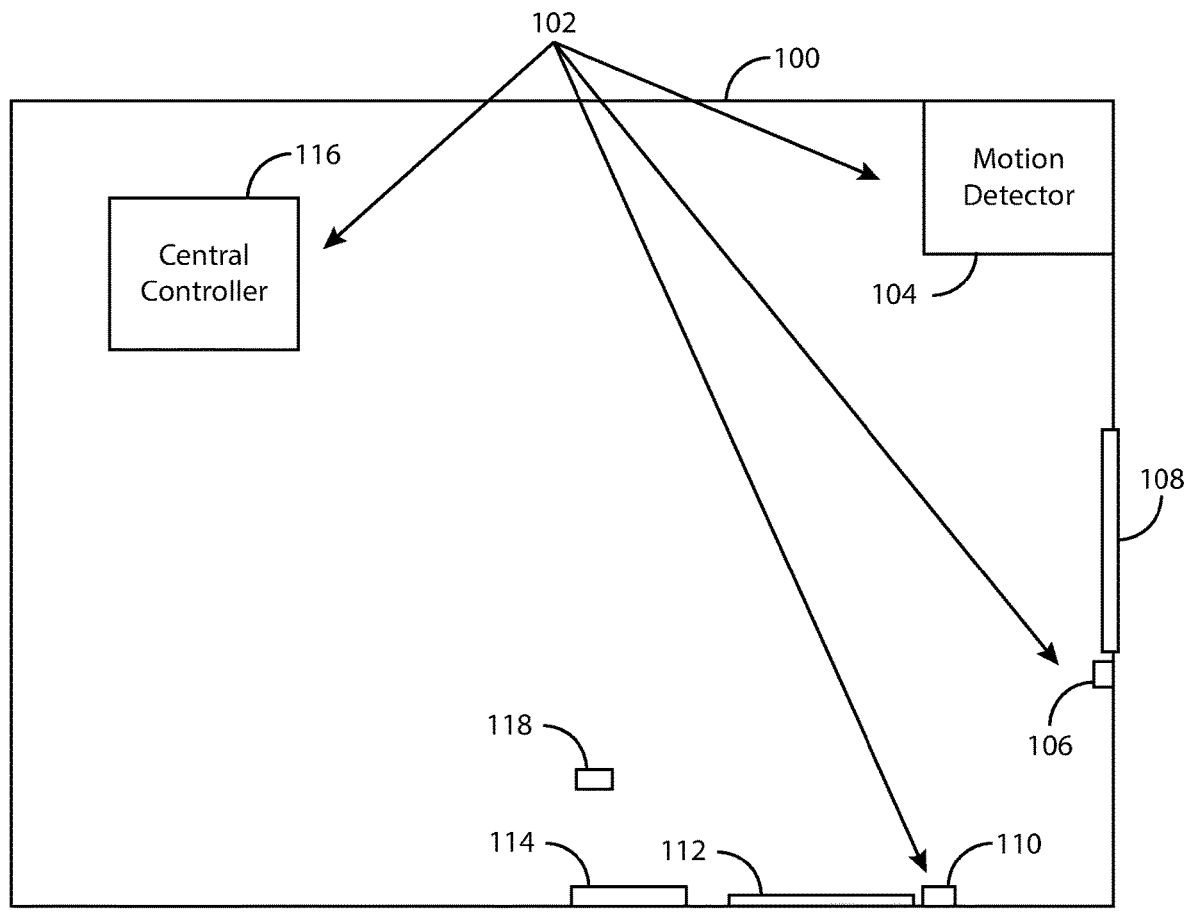
FIG. 1 is a top, plan view of one embodiment of a structure comprising security a system that monitors the structure to detect unauthorized entry.

FIG. 1 is a top, plan view of one embodiment of a structure 100 comprising security system 102 that monitors structure 100 to detect unauthorized entry into structure 100, such as a home, office, warehouse, apartment, etc. Security system 102, in this example, comprises a motion detector 104, an entry sensor 106 for monitoring a window 108, another entry sensor 110 for monitoring an entry door 112, a battery-powered hardware token reader 114 and a central controller central monitoring device 116. In this example, security system 102 comprises only motion detector 102, entry sensor 106, entry sensor 110, battery-powered hardware token reader 114 and central controller central monitoring device 116. However, security systems typically comprise additional components, such as one or more garage tilt sensors, glass break sensors, sirens, etc. These components have been omitted in order to focus attention on battery-powered hardware token reader 114.

Central monitoring device 116 monitors the sensors, i.e., motion detector 104, entry sensor 106 and entry sensor 110 to determine when movement is detected inside structure 100 by motion detector 104, when entry door 112 has been opened as determined by entry sensor 112, and when window 108 has been opened as determined by entry sensor 106. Each of the sensors monitors their respective areas/doors/windows and transmits a wireless signal to central monitoring device 116 when an event occurs, such as movement or a door/window being opened.

Motion detector 104 comprises a sensor/transmitter combination for determining the presence of one or more persons inside structure 100, and for transmitting "motion detected" signals wirelessly to central monitoring device 116 when motion is detected. Motion detector 104 may comprise a battery-powered motion sensor using passive infra-red (PIR) detection techniques, as known in the art, to detect infra-red heat as a person moves inside structure 100. Motion detector 102 may, alternatively or in combination, comprise an occupancy sensor, used to determine the presence of one or more persons inside structure 100 using techniques such as ultrasonic, infra-red, thermal, or other well-known techniques to determine if a person is occupying area 100. Unlike traditional motion (PIR) sensors, occupancy sensors generally do not require movement of a person in order to detect their presence.

Entry sensors 106 and 110 typically comprise well-known door/window sensors, each comprising a magnetically-controlled reed switch and a transmitter or transceiver, and a magnet located on a moveable portion of a window or on a door. When a door or window is opened, the magnet moves away from the reed switch, causing the reed switch to change state, thereby triggering a transmission indicating that the door or window has been opened.

Central monitoring device 116 comprises a home security panel, gateway, hub or some other device that monitors the sensors. Examples of central monitoring device 116 include a GC3 Security & Control panel sold by Nortek Security and Control, Inc., a base station sold as part of an alarm security kit by Ring, Inc., a Pulse® interactive touch screen panel sold by ADT, Inc. In other embodiments, central monitoring device 116 may not be used. In those embodiments, the sensors are monitored by a remote server in communication with the sensors via a wide-area network, such as the Internet and/or a cellular or wired telephone network, and a local-area network (LAN) located inside structure 100. In the remaining disclosure, any reference to central monitoring device 116 may include reference such a remote server. In some embodiments, central monitoring device 116 comprises both security and home monitoring and control functionality for controlling lights, controlling music, televisions, water features, etc.

Security system 102 may be operated in a number of modes or states, such as "disarmed", "armed-home", and "armed-away". In the disarmed mode, central monitoring device 116 ignores wireless signals from any the security sensors and takes no action, such as causing a siren to sound or to contact a remote monitoring center. In the armed-home mode, central monitoring device 116 monitors only perimeter sensors, such as entry sensors 106 and 110, while ignoring signals from motion detector 104. This is to allow authorized people inside structure 100 to move about without triggering security system 102, while continuing to monitor any entry sensors for unauthorized entry. In the armed-away mode, central monitoring device 116 monitors all security sensors in security system 102. This mode is typically used when no one is inside structure 102, to monitor for both movement within structure 102 as well any door or window openings.

When central monitoring device 116 receives a signal from one of the security sensors when security system 102 is in an armed mode of operation (i.e., either armed-home or armed-away), central monitoring device 116 may perform one or more actions, such as to contact a remote security monitoring center via a wide-area network, or by some other means, such as via cellular communication technology. Alternatively, or in addition, central monitoring device 116 may cause a siren inside of area 100, or elsewhere in another location inside a home or business, to sound, and/or a strobe light (not shown) to flash.

Battery-powered hardware token reader 114 is used to at least disarm security system 102. For example, when security system 102 is in an armed-home or an armed-away mode of operation, an authorized user of security system 102 may place central monitoring device 116 into the disarmed mode of operation by bringing a tag 118 within range of battery-powered hardware token reader 114. Battery-powered hardware token reader 114, in turn, detects tag 118, determines that tag 118 is authorized to disarm security system 102, and transmits a security system disarm command to central monitoring device 116. Central monitoring device 116 receives the security system disable command and, in response, enters the disarmed mode of operation.

Battery-powered hardware token reader 114 comprises one of a number of battery-operated electronic reading devices that can sense the presence of tag 118 when tab 118 is brought within range of battery-powered hardware token reader 114. Battery-powered hardware token reader 114 comprises one of an RFID reader, a bar code reader, a transponder reader, a detector for detecting a ferrous object, such as a reed switch, or any detector that can detect the presence of an object within a range of battery-powered hardware token reader 114. Battery-powered hardware token reader 114 comprises a processor that executes processor-executable instructions for conserving power. Hardware tokens readers are typically powered by a constant source of power, so there is no need to conserve power. Battery-operated hardware token readers exist, but they are generally not capable of conserving power so that their batteries last an appreciable amount of time, such as a year or more.

Tag, or hardware token, 118 comprises an RFID tag, a bar code, a transponder, an RF transmitter, or a hardware token that is typically programmable in order to provide information to battery-powered hardware token reader 114. Tag 118 is typically embedded or printed on a small plastic "fob" which can easily fit inside a pocket. Tags can store several thousand bytes of data and are typically composed of a microchip, antenna and, in the case of active and semi-passive tags, a battery. In a typical application, tag 118 receives electromagnetic energy from battery-powered hardware token reader 114 when tag 118 is held within range of battery-powered hardware token reader 114, typically from 0-24 inches. Then, using power from its internal battery or power harvested from an electromagnetic field produced by battery-powered hardware token reader 114, tag 118 sends radio signals back to battery-powered hardware token reader 114 that include information stored within the tag. Battery-powered hardware token reader 114 demodulates the radio signals to receive the information stored on tag 118.

Tag 118 may be passive, requiring no battery, or active, requiring a small battery to operate. Tag 118 is typically assigned a unique identifier, such as an alpha-numeric, hexadecimal or binary code during the manufacturing process that uniquely identifies each tag. Additionally, tag 118 may be programmed with application data that identifies a tag as being authorized to disarm security system 102, as will be explained in greater detail later herein.

Figure 2:
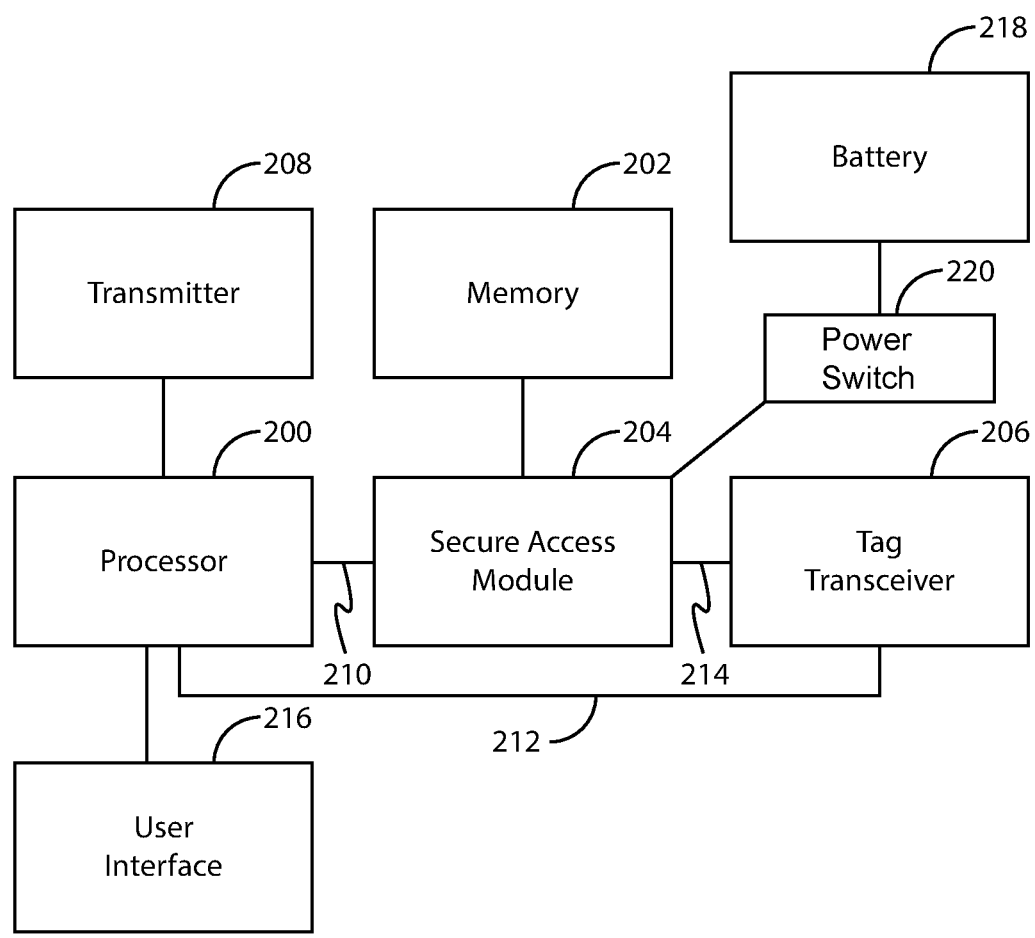
FIG. 2, is a functional block diagram of one embodiment of a battery-powered hardware token reader.
Figure 3A:
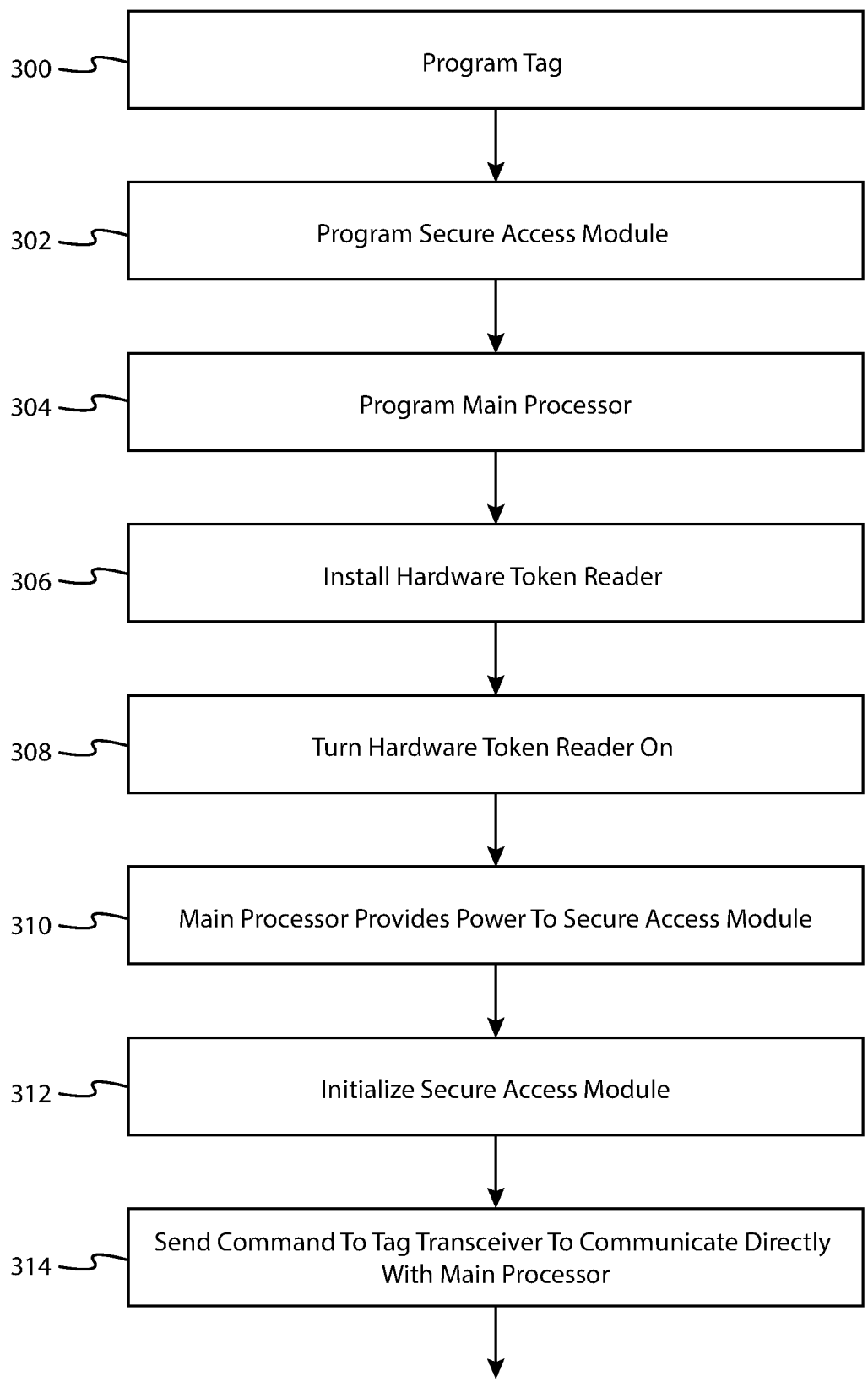
FIGS. 3A-3D power flow diagrams illustrating one embodiment of a method for reducing power consumption of a battery-powered hardware token reader.
Figure 3B:
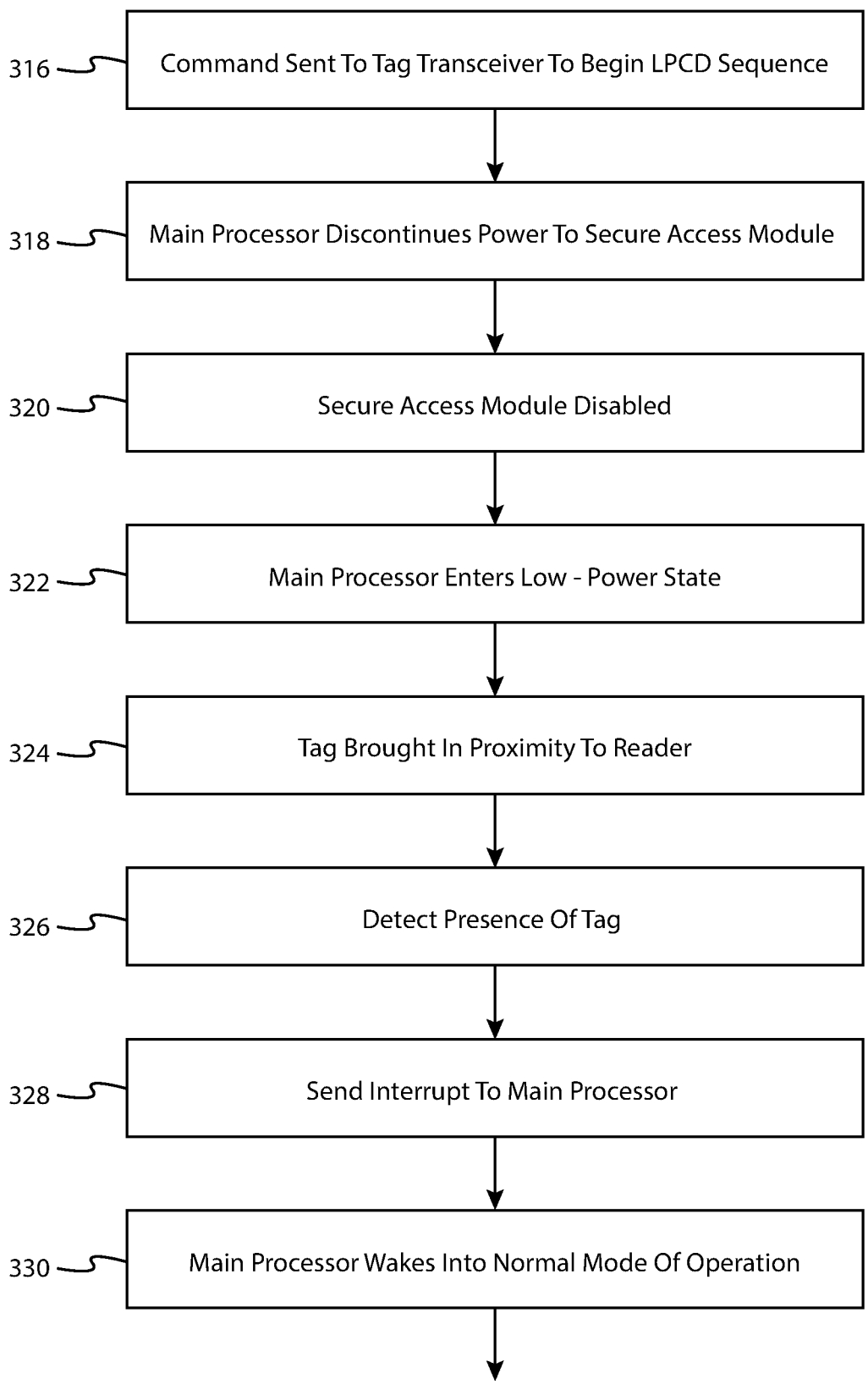
Figure 3C:
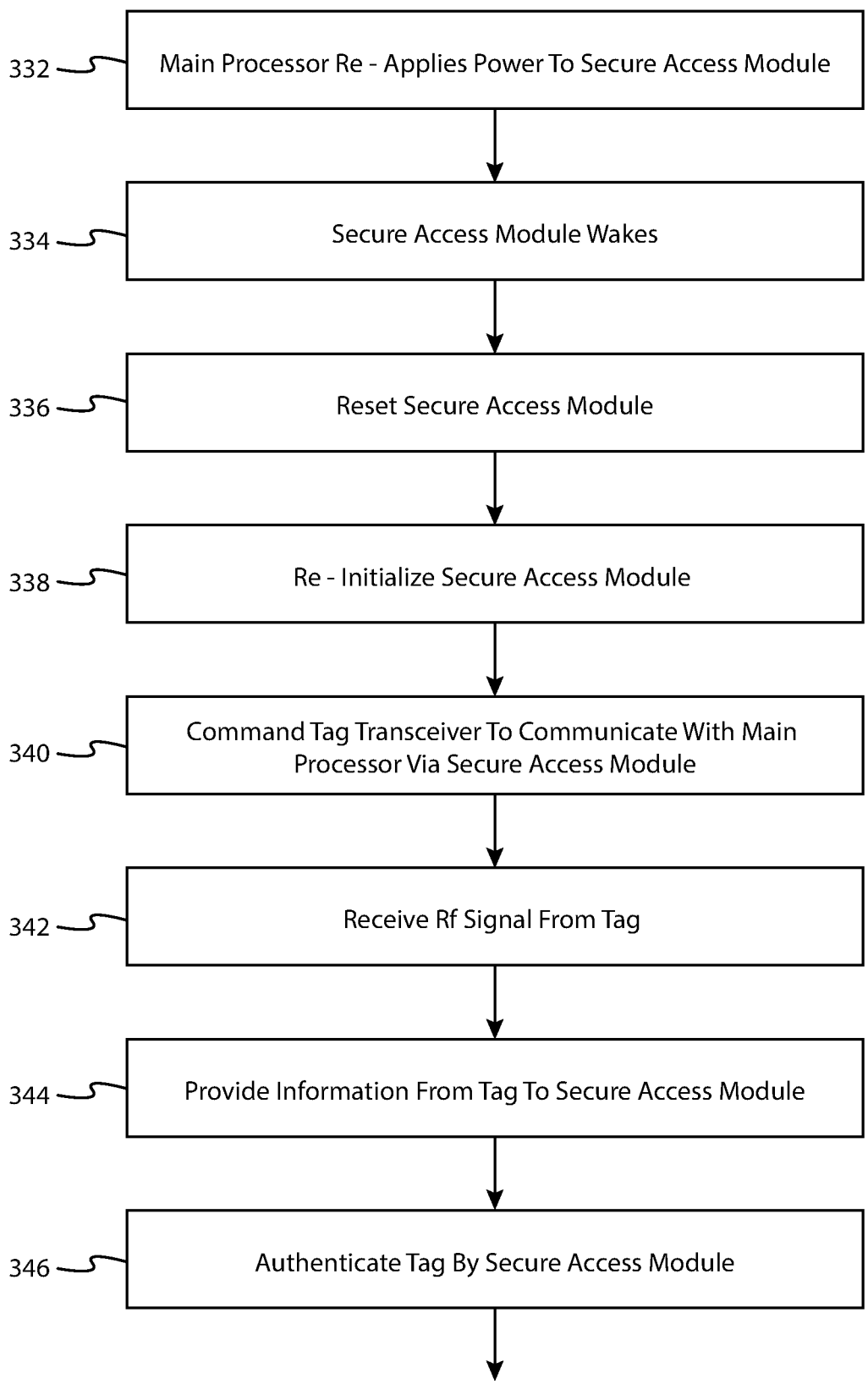
Figure 3D:
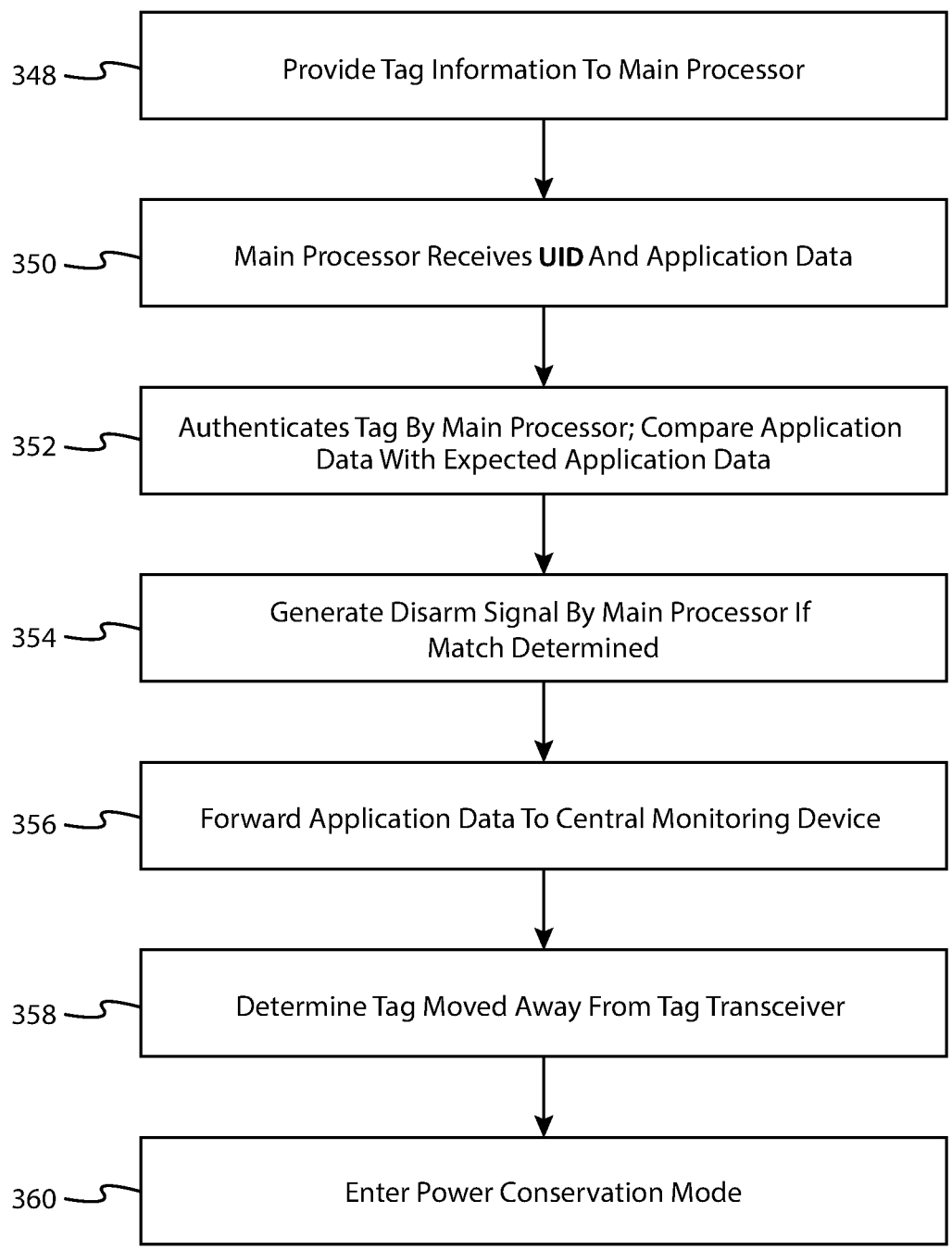

FIG. 2 is a functional block diagram of one embodiment of battery-powered hardware token reader 114. Specifically, FIG. 2 shows main a main processor 200, a non-transitory memory 202, a secure access module 204, a tag transceiver 206, a transmitter 208, a communication buss 210, a communication buss 212, a communication buss 214, a user interface 216 and a battery 218. It should be understood that the functional blocks may be coupled to one another in a variety of ways, and that not all functional blocks necessary for operation of battery-powered hardware token reader 114 (such as a power supply), for purposes of clarity.

Main processor 200 is provides general operation of battery-powered hardware token reader 114 by executing processor-executable instructions stored in non-transitory memory 202, for example, executable computer code. Main processor 200 typically comprises a general purpose processor, such as an EFR32 system-on-chip manufactured by Silicon Laboratories of Austin, Texas, although any one of a variety of microprocessors, microcomputers, and/or microcontrollers may be used alternatively. Processor 200 is typically selected based on processing power, size and cost.

Non-transitory memory 202 is coupled to main processor 200, comprising one or more non-transitory information storage devices, such as RAM, ROM, EEPROM, flash, or some other type(s) of electronic, optical, or mechanical memory devices. Non-transitory memory 202 is used to store processor-executable instructions for operation of battery-powered hardware token reader 114 as well as any information used by main processor 200, such as authentication keys, expected application data, information for initializing secure access module 204, and/or other information needed by main processor 200 to conduct operations.

Secure access module 204 is coupled to main processor 200 via communication buss 210. Secure access module 204 provides authentication and secure communications between main processor 200 and tag transceiver 206. In one embodiment, secure access module 204 comprises an MF4SAM3HN secure access module manufactured by NXP Semiconductors of Eindhoven, Netherlands. In other embodiments, secure access module 204 comprises any device or module that provides secure communications between main processor 200 and tag transceiver 206.

Tag transceiver 206 is electronically coupled to main processor 200 via communication buss 212 and to secure access module 204 via communication buss 214. Tag transceiver 206 broadcasts periodic RF signals that are received by a tag within range of tag transceiver 206. When a tag receives the RF signal transmitted by tag transceiver 206, it broadcasts a response RF signal comprising an encrypted universal identifier (UID), information used to authenticate the tag, such as an encrypted digital signature, an encrypted serial number, cryptographic keys, or other information well-known in the art to perform authentication. Encrypted application data may be transmitted as well. The encrypted application data may comprise a code for authorizing the tag to at least disarm security system 102. In one embodiment, tag transceiver 206 comprises a CLRC663 "frontend", also manufactured by NXP Semiconductor. In other embodiments, tag transceiver 206 may comprise a Bluetooth low energy receiver, an NFC receiver, a barcode scanner, or some other electronic device for reading a tag or other hardware token.

Transmitter 208 is coupled to main processor 200, comprising circuitry necessary to transmit wireless communication signals from battery-powered hardware token reader 114 to central monitoring device 116. Such circuitry is well known in the art and may comprise hardware in accordance with Wi-Fi, RF, Bluetooth, Zwave®, Zigbee®, Clearsky® or Matter communication protocols, among others. In some embodiments, transmitter to update additionally comprises a receiver for receiving information from central monitoring device 116. In one embodiment, transmitter 208 is part of a system-on-chip comprising processor 200 and non-transitory memory 202, such as an EFR32 system-on-chip manufactured by Silicon Laboratories of Austin, Texas.

User interface 216 is coupled to main processor 200, comprising hardware that allows a user to interact with battery-powered hardware token reader 114. User interface 216 may comprise a touchscreen display, a liquid crystal display (LCD), one or more light emitting diode displays (LEDD), one or more light emitting diodes (LEDs), light arrays, or any other type of visual display. Further, the electronic display could alternatively or in addition comprise an audio device, such as a speaker and related amplification circuitry, for audible presentation of information to a user. Of course, the aforementioned items could be used alone or in combination with each other and other devices may be alternatively, or additionally, used.

Battery 218 powers all of the bathroom aforementioned functional blocks. Battery 218 typically provides a DC voltage to the aforementioned functional blocks, typically between 3 and 9 volts with sufficient capacity to power battery-powered hardware token reader 114 for an extended period of time, for example, one year or more. Battery life is an important design consideration for consumer products such as battery-powered hardware token reader 114. Battery 218 may comprise one or more batteries, such as one or more AA batteries, one or more 9 volt batteries, one or more AAA batteries, etc.

Power switch 220 provides power from battery 218 to secure access module 204 upon a command from main processor 200 when tag 118 is brought in proximity to tag transceiver 206. Power from battery 218 is removed from secure access module 204, also from a command from main processor 200 when main processor 200 disables secure access module 204 when battery-powered hardware token reader 114 enters a low-power consumption mode of operation. Power switch 220 may comprise a relay, transistor, MOSFET transistor, or some other designated hardware switch for providing power to secure access module 204 under the control of main processor 200.

FIG. 3 is a flow diagram illustrating one embodiment of a method for reducing power consumption in a battery-powered hardware token reader. While the method of FIG. 3 is described in terms of disarming security system 102, it should be understood that the concepts described could be used to alternatively or in addition to place security system 102 into an armed-home mode of operation, into an armed away mode of operation, cause security system 102, or some other related system, to create a "scene" or place security system 102 into an off mode of operation. It should also be understood that in some embodiments, not all of the steps shown in FIG. 3 are performed. It should also be understood that the order in which the steps are carried out may be different in other embodiments.

At block 300, tag 118 is programmed by a manufacturer of tag 118 to include a universal identifier (UID), authentication information, and/or application data. In some embodiments, some or all of this information is encrypted. The UID is a unique identifier that uniquely identifies tag 118. The authentication information may comprise one or more encryption keys such as one or more public and/or private cryptographic keys used in asymmetric encryption protocols and/or one or more digital signatures assigned to tag 118. The application data generally comprises one or more codes that allow tag 118 to at least disarm security system 102 or to otherwise indicate that tag 118 is an authorized hardware token for at least disarming security system 102.

At block 302, secure access module 204 may be programmed by a manufacturer of secure access module 204 or battery-powered hardware token reader 114, to include one or more cryptographic keys and/or one or more digital encryption signatures to establish a secure communication with tag 118, and in some embodiments, read encrypted information on tag 118. Secure access module 204 may additionally be programmed with one or more encryption protocols in order to encrypt and decrypt information sent to, and received from, tag 118. Typically, tag 118 and secure access module 204 are programmed with complementary encryption keys, so that secure access module 204 can decrypt and authenticate one or more particular tags 118. Secure access module 204 may additionally be programmed with additional cryptographic keys and a different encryption protocol in order to communicate securely with main processor 200.

At block 304, main processor 200 may be programmed by a manufacturer of battery-powered hardware token reader 114 by storing one or more cryptographic keys and/or one or more digital encryption signatures in non-volatile memory 202, for establishing a secure communication with secure access module 204, and in some embodiments, read encrypted information received from tag 118 via secure access module 204. In one embodiment, a secure access module master cryptographic key is stored into non-volatile memory 202 in order to activate secure access module 204 for the first time. Main processor 200 may additionally be programmed with one or more encryption protocols in order to encrypt and decrypt information sent to, and received from, secure access module 204. Typically, main processor 200 and secure access module 204 are programmed with complementary encryption keys, so that main processor 200 can decrypt encrypted information received from secure access module 204. A disarm code may also be stored in nonvolatile memory 202. The disarm code is a numeric or alphanumeric sequence that may be compared to application data stored on tag 118, to determine whether tag 118 is authorized to at least disarm security system 102. The disarm code may be referred to herein as "application data".

At block 306, battery-powered hardware token reader 114 is installed at a home or business, inside structure 100.

At block 308, battery-powered hardware token reader 114 is turned on by a user of battery-powered hardware token reader 114. Battery 218 provides DC power to the components of battery-powered hardware token reader 114. In one embodiment, power is not immediately supplied to secure access module 204.

At block 310, in one embodiment, main processor 200 provides power to secure access module 204. Power to secure access module 204 is controlled by power switch 220.

At block 312, after providing power to secure access module 204, main processor 200 may initialize secure access module 204 by sending one or more commands via communication buss 210. Initialization may comprise resetting secure access module 204 via a command sent by main processor 200. Initialization may further comprise main processor 200 checking an activation state of secure access module 204, i.e., activated or not activated (in an embodiment where secure access module 204 may be shipped from the manufacturer in a limited-functionality, or inactivated, state). If secure access module 204 is not activated, a secure access module master cryptographic key, previously provisioned into memory 202, may be used by main processor 200 to activate secure access module 204. Initialization may further comprise main processor 200 generating one or more secure session keys and establishing a secure, encrypted communication link with secure access module 204 via communication buss 210. Initialization may additionally comprise main processor 200 sending a command to secure access module 204 for secure access module 204 to set up communication bus 214 for secure access module 204 to communicate directly, and securely, with tag 118 via tag transceiver 206. The command may comprise an identification of a particular hardware configuration to be implemented by secure access module 204 to initialize secure communications between secure access module 204 and tag transceiver 206. After the particular hardware configuration has been established, secure access module 204 is able to perform secure communications with tag transceiver 206 via communication bus 214.

At block 314, main processor 200 may switch communications between main processor 200 and tag transceiver 206 from an indirect communication via secure access module 204 to a direct communication directly with the tag transceiver 206 via communication bus 212. Main processor 200 sends a command directly to tag transceiver 206 via communication bus 212 for tag transceiver 206 to begin communicating directly with main processor 200 via communication bus 212. In one embodiment, this process is referred to by NXP Semiconductors as "X/S-Mode hybrid". However, in the X/S-Mode hybrid process, secure access module 204 is merely placed in a low-power state, rather than being completely powered down, as explained below.

At block 316, main processor 200 sends a command to tag transceiver 206 via communication bus 212 to begin an autonomous low-power card detect (LPCD) sequence. The LPCD sequence is well known in the art, causing tag transceiver 206 to periodically transmit a low-power RF signal, used to detect the presence of a hardware token, such as tag 118, within range of tag transceiver 206.

At block 318, main processor 200 discontinues power to secure access module 204.

At block 320, as a result of main processor 200 discontinuing power to secure access module 204, secure access module 204 is completely disabled, consuming no power from battery 218.

At block 322, main processor 200 enters a low-power state of operation, consuming less power than in its normally active state. Battery-powered hardware token reader 114 is now in a power conservation mode of operation, with main processor 200 "asleep", secure access module 204 disabled, and tag transceiver 206 periodically transmitting low power RF signals for detection of a nearby hardware token.

At block 324, tag 118 is brought in proximity to tag transceiver 206 by an authorized user of security system 102. Security system 102 may be in an armed-home or armed-away mode of operation, and tag 118 is used by the authorized user to disarm security system 102.

At block 326, as a result of tag 118 being brought in proximity to tag transceiver 206, tag transceiver 206 detects the presence of tag 118, using techniques well-known in the art.

At block 328, in response to detecting the presence of tag 118 tag transceiver 206 sends an interrupt to main processor 200 via communication bus 212.

At block 330, main processor 200 receives the interrupt and, in response, wakes up from its low-power state into its normally active operating state.

At block 332, in response to the interrupt, main processor 203 re-applies power to secure access module 204.

At block 334, in response to receiving power, secure access module 204 wakes up into an active state, capable of receiving commands from main processor 200.

At block 336, main processor 200 may send a command to secure access module 204 for secure access module 204 to reset itself.

At block 338, main processor 200 may re-initialize secure access module 204 as explained above. Re-initialization is typically necessary, because unlike in a low-power state of operation, secure access module 204 typically loses all initialization information received during the original initialization at block 312 due to a complete loss of power caused by main processor 200 at block 318. Typically, secure access module 204 is not designed to retain data once it is powered off. Re-initialization typically comprises establishing a secure communication session with secure access module 204 via communication bus 210, in one embodiment using the secure access module master cryptographic key previously discussed above. Typically, a cryptographic session key is established between main processor 200 and secure access module 204 and main processor 200 and secure access module 204 use the cryptographic session key to encrypt and decrypt information passed between them via communication bus 210. Main processor 200 additionally configures secure access module 2044 communications with tag transceiver 206, as discussed previously.

At block 340, main processor 200 switches communications between main processor 200 and tag transceiver 206 back to indirect communications via secure access module 204 by sending a command directly to tag transceiver 206 for tag transceiver 206 to being communicating indirectly with main processor 200 via secure access module 204. In response, tag transceiver 206 begins using communication bus 214 to communicate with main processor 200. At this point, a secure channel has been created from tag 118, through tag transceiver 206, through communication bus 214, through secure access module 204, through communication bus 210, to main processor 200. Generally, it takes up to 500 milliseconds for blocks 328 through 340 to occur.

At block 342, tag transceiver 206 receives an RF signal from tag 118 comprising the UID, the authentication information, and the application data typically. In one embodiment, a digital signature of tag 118 is received. Tag transceiver 206 demodulates the RF signal. Some or all of this information may be encrypted.

At block 344, tag transceiver 206 provides the UID, the authentication information, and the application data to secure access module 204 via communication bus 214. In another embodiment, transceiver 206 provides a digital signature for authentication purposes. In one embodiment, some or all of this information is encrypted by tag transceiver 206.

At block 346, secure access module may authenticates tag 118 using the authentication information provided by tag transceiver 206, using well-known authentication techniques. In another embodiment, secure access module 204 does not authenticate tag 118.

At block 348, in one embodiment, if tag 118 has been authenticated successfully by secure access module 204, secure access module 204 provides the UID and the application data to main processor 200 via communication bus 210. Typically, secure access module 204 encrypts the UID and the application data in accordance with the session key established in a prior step between main processor 200 and secure access module 204.

At block 350, main processor 200 receives the UID and the application data. In one embodiment, main processor 200 decrypts the UID and the application data in accordance with the session key previously established with secure access module 204.

At block 352, in one embodiment, main processor 200 authenticates tag 118 using techniques well-known in the art and, if authenticated, compares the application data to expected application data stored in memory 202 in order to determine if tag 118 is authorized to disarm security system 102.

At block 354, in one embodiment, if a match is determined by main processor 200 at block 350, main processor 200 generates a disarm signal and provides the disarm signal to transmitter 208. In one embodiment, the disarm signal comprises a code that is used by central monitoring device 116 to disarm security system 102. The code may be the same, or different, then the application data/expected application data.

At block 356, in another embodiment, main processor 200 does not compare the application data to expected application data stored in memory 202. In this embodiment, main processor 200 simply forwards the application data to central monitoring device 116 via transmitter 208, and central monitoring device 116 determines whether the application data matches expected application data stored in central monitoring device 116, i.e., a code to disarm security system 102.

At block 358, tag transceiver 206 determines that tag 118 has been moved away from tag transceiver 206 and out of range.

At block 358, either in response to determining that tag 118 has been moved out of range of tag transceiver 206, or after transmission by transmitter 208, main processor 200 again places central monitoring device 116 into a low-power mode of operation by repeating blocks 312 through 320, above, monitoring for another tag to be brought in proximity with tag transceiver 206.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention may comprise a computer-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

I claim:

1. A method for reducing power consumption of a battery-powered hardware token reader, comprising:

causing, by a main processor of the battery-powered hardware token reader, power to be provided to a secure access module coupled to the main processor, the secure access module disposed between a radio frequency (RF) tag transceiver and the main processor for providing a secure means of communication between the RF tag transceiver of the battery-powered hardware token reader and the main processor;

in response to power being provided to the secure access module, initializing, by the main processor, the secure access module; and in response to the secure access module being initialized by the main processor, disabling, by the main processor, the secure access module while continuing to periodically provide power to the RF tag transceiver;

wherein the secure access module consumes no battery power when disabled and the main processor of the battery-powered hardware token reader causes power to be provided to the secure access module in response to the RF tag transceiver signaling directly to the main processor via a communication path that does not include the secure access module that the RF tag transceiver has detected that an RF tag has been brought into proximity to the RF tag transceiver.

2. The method of claim 1, further comprising:
switching, by the main processor, communications between the main processor and the RF tag transceiver coupled to the main processor from an indirect communication via the secure access module to a direct communication directly with the RF tag transceiver.

3. The method of claim 2, further comprising:
after switching communications to communicate directly with the RF tag transceiver, sending a command, by the main processor to the RF tag transceiver for the RF tag transceiver to begin a particular autonomous low power card detect sequence.

4. The method of claim 3, further comprising:
after sending the command for the RF tag transceiver to begin a particular autonomous low power card detect sequence, entering, by the main processor, a sleep mode of operation.

5. The method of claim 2, further comprising:
detecting, by the RF tag transceiver, the presence of the RF tag; and
in response to detecting the presence of the RF tag, sending, by the RF tag transceiver, an interrupt directly to the main processor for the main processor to wake the main processor.

6. The method of claim 5, further comprising:
re-enabling, by the main processor, the secure access module;
switching, by the main processor, communications between the main processor and the RF tag transceiver back to indirect communications via the secure access module;
re-initializing, by the main processor, the secure access module; and
reading, by the main processor via the secure access module and the RF tag transceiver, the RF tag.

7. The method of claim 6, further comprising:
authenticating, by the main processor, the RF tag;
reading, by the main processor via the secure access module and the RF tag transceiver, application data stored on the RF tag; and
transmitting, by the main processor via a transmitter coupled to the main processor, a security system disarm command after the RF tag has been authenticated and the application data matches expected application data stored in a memory coupled to the main processor.

8. The method of claim 5, further comprising:
detecting, by the main processor via the secure access module and the RF tag transceiver, that the tag is no longer in range of the tag transceiver; and
in response to detecting that the RF tag is no longer in range of the RF tag transceiver, disabling, by the main processor, the secure access module.

9. A battery-powered hardware token reader for disarming a security system, comprising:
a non-transitory memory for storing processor-executable instructions;
a radio frequency (RF) tag transceiver;
a secure access module for encrypting and decrypting information sent between the RF tag transceiver and a main processor and disposed between the RF tag transceiver and the main processor; and
the main processor, coupled to the non-transitory memory, the RF tag transceiver, and the secure access module, the main processor for executing the processor-executable instructions that causes the battery-powered hardware token reader to:
cause, by the main processor, power to be provided to the secure access module;
in response to power being provided to the secure access module, initialize, by the main processor, the secure access module; and
in response to the secure access module being initialized by the main processor, disable, by the main processor, the secure access module while continuing to periodically provide power to the RF tag transceiver;
wherein the secure access module consumes no battery power when disabled and the main processor of the battery-powered hardware token reader causes power to be provided to the secure access module in response to the RF tag transceiver signaling directly to the main processor via a communication path that does not include the secure access module that the RF tag transceiver has detected that an RF tag has been brought into proximity to the RF tag transceiver.

10. The battery-powered hardware token reader of claim 9, further comprising:
a communication bus coupled to the non-transitory memory, the RF tag transceiver, the secure access module, and the main processor;
and the processor-executable instructions comprise further instructions that causes the battery-powered hardware token reader to:
switch, by the main processor, communications between the main processor and the RF tag transceiver from an indirect communication via communication bus and the secure access module to a direct communication directly with the RF tag transceiver via the communication bus.

11. The battery-powered hardware token reader of claim 10, wherein the processor-executable instructions comprise further instructions that causes the battery-powered hardware token reader to:
after switching communications to communicate directly with the RF tag transceiver via the communication bus, send a command, by the main processor via the communication bus, to the RF tag transceiver for the RF tag transceiver to begin a particular autonomous low power card detect sequence.

12. The battery-powered hardware token reader of claim 10, wherein the processor-executable instructions comprise further instructions that causes the battery-powered hardware token reader to:

after sending the command for the RF tag transceiver to begin a particular autonomous low power card detect sequence, enter, by the main processor, a sleep mode of operation.

13. The battery-powered hardware token reader of claim 10, wherein the processor-executable instructions comprise further instructions that causes the battery-powered hardware token reader to:

detect, by the RF tag transceiver, the presence of a the RF tag; and in response to detecting the presence of the RF tag, send, by the RF tag transceiver via the communication bus, an interrupt directly to the main processor for the main processor to wake the main processor.

14. The battery-powered hardware token reader of claim 13, wherein the processor-executable instructions comprise further instructions that causes the battery-powered hardware token reader to:

after awakening, re-enable, by the main processor via the communication bus, the secure access module;

switch, by the main processor, communications between the main processor and the RF tag transceiver back to indirect communications via the secure access module;

re-initialize, by the main processor via the communication bus, the secure access module; and read, by the main processor via the secure access module and the RF tag transceiver, the RF tag.

15. The battery-powered hardware token reader of claim 14, further comprising:

a transmitter coupled to the main processor;

wherein the processor-executable instructions comprise further instructions that causes the battery-powered hardware token reader to:

authenticate, by the main processor, the RF tag;

read, by the main processor via the secure access module and the RF tag transceiver, application data stored on the RF tag; and transmit, by the main processor via the transmitter, a security system disarm command after the RF tag has been authenticated and the application data matches expected application data stored in the memory.

16. The battery-powered hardware token reader of claim 13, wherein the processor-executable instructions comprise further instructions that causes the battery-powered hardware token reader to:

detect, by the main processor via the secure access module and the RF tag transceiver, that the RF tag is no longer in range of the RF tag transceiver; and in response to detecting that the RF tag is no longer in range of the RF tag transceiver, disable, by the main processor, the secure access module.

* * * * *